UNITED STATES PATENT OFFICE.

WILLIAM CHARLES ARTHUR ROETTGER, OF BRUSSELS, BELGIUM.

IMPROVEMENT IN THE MANUFACTURE OF ARTIFICIAL MARBLE.

Specification forming part of Letters Patent No. 169,294, dated October 26, 1875; application filed March 4, 1875.

*To all whom it may concern:*

Be it known that I, WILLIAM CHARLES ARTHUR ROETTGER, of 175 Rue Gaucheret, Brussels, in the Kingdom of Belgium, a British subject, have invented or discovered new and useful Improvements in the Manufacture of Artificial Marble; and I, the said WILLIAM CHARLES ARTHUR ROETTGER, do hereby declare the nature of the said invention and in what manner the same is to be performed, to be particularly described and ascertained in and by the following statement thereof—that is to say:

The main ingredient of this marble is a fine white powder, prepared from Iceland spar, or calc-spar or their equivalents, by burning them in kilns. Blocks of the materials employed thus burned are, when perfectly cooled down, placed in a bath containing a solution of certain salts which, being the result of decomposition of aluminum, borax, copper, iron, potassium, sodium, &c., are soluble in water. These salts are either silicates, sulphates, or acids, and are added to the water for the bath at the rate of one hundred grams (three and one-third ounces) to one litre (one quart) of soft water. When the stones thus exposed in the bath have absorbed a sufficient quantity of silica they are withdrawn, dried in the air, burned again, and afterward reduced in the ordinary way to the fineness required. In the burning process great care is to be taken not to expose the blocks saturated, as above described, to too sudden nor to too great a heat. As the quality of the prepared powder will greatly depend on the reburning process, much attention has to be paid to what I have just stated. The heat of the blocks should not exceed an ordinary red heat. I also use alabaster or marble cements or other substances containing sulphate of lime in admixture with alum or sulphates of metals, but a cement containing a certain percentage of silica, alumina, copper, borax, or iron is preferable. Where alum or sulphates form ingredients of the prepared powder I introduce, when mixing them for use in order to harden them, binoxide of hydrogen $HO_2$ or oxygenated water sufficient to form the prepared powder into a paste fit to be worked with. For white marble I mix three per cent. of oxide of zinc to ninety-seven of prepared powder. For black kinds I employ the peroxide of manganese and for colored kinds diverse mineral oxides, avoiding entirely organic or vegetable colors.

Having most carefully ground and mixed my colors in accordance with the shade of marble required to be made, I proceed to mix the prepared powder with water to the consistency of a thick cream, to which I add the colors in a moist state, and, if necessary, pass the mixture through a fine hair-sieve. With these colored pastes I lay on a flat, engraved, or embossed surface the various veins, their tints and colors, and all the other shades of the marble, which I wish to represent on the surface of the marble which I am making, and proceed otherwise in the same manner as if I were to take a cast in plaster-of-paris. In an ordinary slab I lay the thickness of the colored paste to about an eighth of an inch, and having carefully passed the same with a trowel to insure that the whole surface to be covered with cement has been covered, I spread on this first or colored layer a thin cloth on which I place, under ordinary circumstances, a dry cement of a coarser kind, common plaster-of-paris, sifted ashes, or even sand, in order to withdraw the superfluous water in the first layer of colored cement. After this I remove the cloth and pass the trowel once more in order to fill up any crevices that may have occurred during the last-mentioned operation. If the drying has been effected with coarse cement of the same composition as the fine cement, I mix it with a little more water, as well as with the remaining coloring matter, to a much stiffer consistence than the first mixed cement, and lay on a layer about the same thickness as the first. If the object made offers a rather large surface in proportion to its intended thickness, I introduce on this second layer a piece of coarse canvas, which has been previously saturated in a solution of silicate of potash, or soda, or sulphate of copper, in order to preserve it from rot and prevent it shrinking when in the cement. On this I now lay the last part of the coarse cement, as stated above. When the marble has to represent sculpture, and a chisel has to be used afterward in order to correct the object produced, I lay the colored surface on much thicker by degrees, having first made the same thickness, as before stated, I dry with the same fine cement, which I afterward employ mixed with water and colors, and which will serve as a second colored layer. I continue this process until I have the thickness wanted.

In order to drive out the air that is to be met with in bubbles in the wet cement after it was laid on, I employ a piece of wood in the shape of a large brush where, in the place of bristles, there are pieces of wood or brass wire of the thickness of a good sized pin. Inserted with this I press the back of the piece of work done. Afterward I pass the trowel.

My invention further relates to the application of the above cements, in combination with Portland and other cements, in the manufacture of tiles for pavement. In this proceeding I mix the colors and the fine powder in a dry state, and then only moisten it without making it into a paste. Afterward I place this colored mixture, so moistened, into a press containing a mold or die, which will give the shape or form required. This press resembles much an ordinary brick press, having a zinc or iron plate in the bottom of the mold on which the newly-made cement tile is removed from it. Having placed the fine powder into the mold in the proportion of about one-tenth, I back it up with nine-tenths of a concrete mixture made of silicate, Portland or any other hydraulic cements, one part, sand or gravel, five parts, hydraulic lime, one part. These proportions may be varied according to the binding power of the cement employed for backing. The whole is now condensed by a strong pressure, taken out, and allowed to dry. Where I wish to produce inlaid work, I make the different shapes and colors destined for incrustation first in special molds out of the fine colored mixture, only I afterward place the object so made into larger molds, fill in the body, as before, with fine cement, or powder, and color combined, and then take out of the mold and allow to dry. In order to amalgamate any particle of cement which may not have been saturated by the moistening process or to remove impurities, I dip the tiles so manufactured after they have set into ordinary water, and then let them completely dry. The surface of the objects made is polished with water, and stones (pumice stone and snake stone) and holes that may appear on the surface, are filled in with the same mixture of powder and color as the object. When thoroughly dry, I rub the surface with oil once or twice. If after this there should appear a kind of rust or film still on the surface, I wash it with diluted hydrochloric acid. When dry again, I polish the surface with a mixture of silicate of soda, or silicate of potash about seven (7) per cent., olive oil three (3) per cent., and seventy (70) per cent. of soft water. This mixture I put on a soft rag with a little tin ashes or emery powder, and then rub the surface with it. The result is a brilliant and lasting polish.

Having thus described the nature of my invention, and in what manner the same is to be performed, I claim—

1. The improvement in the art of manufacturing artificial marble hereinbefore set forth, which consists in preparing powder from blocks of Iceland spar or calc-spar, or their equivalents, by burning them in kilns, cooling them, placing them in a bath composed of soluble silicates, sulphates, or acids, drying them in the air, reburning, and reducing them to powder.

2. The improvement in the art of manufacturing artificial marble hereinbefore set forth, which consists in mixing the prepared powder with water to the consistency of cream, adding the colors in a moist state, spreading the compound on a suitable surface, covering the mixture with a cloth, applying cement or other absorbent material to take up the moisture from the compound to dry the composition, and then removing the cloth and absorbent material to make room for the subsequent application of the backing material.

3. The improvement in the art of manufacturing artificial marble, hereinbefore set forth, which consists in mixing the prepared powder with water to the consistency of cream, adding the colors in a moist state, spreading the compound on a suitable surface, covering the mixture with a cloth, applying cement or other absorbent material to take up the moisture from the compound to dry the composition, then removing the cloth and absorbent material, applying a backing of coarser cement, strengthened by a layer of canvas saturated in a solution of a silicate or sulphate to preserve it from rot and prevent it from shrinking.

4. The improvement in the art of manufacturing artificial marble, hereinbefore set forth, which consists in preparing the object in the manner described, filling any holes in its surface with the same mixture of powder and colors, drying it thoroughly, polishing with stone, and rubbing with oil.

5. The improvement in the art of manufacturing artificial stone, hereinbefore set forth, which consists in cleansing the surface, polished, as hereinbefore described, by washing it with hydrochloride-acid, drying the surface and polishing it with a mixture consisting of silicate of soda or potash, olive oil and soft water put on a soft rag, and rubbed in with tin ashes or emery powder.

W. C. A. ROETTGER.

Witnesses:
  CHAS. P. WRIGHT,
  LEWIS NATHAN.